(12) United States Patent
Rangegowda et al.

(10) Patent No.: US 8,650,326 B2
(45) Date of Patent: Feb. 11, 2014

(54) SMART CLIENT ROUTING

(75) Inventors: Dharshan Rangegowda, Seattle, WA (US); Prashant J. Dongale, Redmond, WA (US); Sufian A. Dar, Redmond, WA (US); Ram Viswanathan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1108 days.

(21) Appl. No.: 12/616,157

(22) Filed: Nov. 11, 2009

(65) Prior Publication Data
US 2011/0113142 A1    May 12, 2011

(51) Int. Cl.
*G06F 15/16* (2006.01)
*G06F 15/173* (2006.01)

(52) U.S. Cl.
USPC .......................................... 709/242; 709/245

(58) Field of Classification Search
USPC .................................. 709/226–229, 238–245
See application file for complete search history.

(56) References Cited

U.S. PATENT DOCUMENTS

| 6,134,530 | A | 10/2000 | Bunting et al. | |
|---|---|---|---|---|
| 6,556,659 | B1 | 4/2003 | Bowman-Amuah | |
| 7,688,753 | B1 * | 3/2010 | Zimran et al. | 370/252 |
| 7,769,887 | B1 * | 8/2010 | Bhattacharyya et al. | 709/238 |
| 8,161,180 | B1 * | 4/2012 | Swift et al. | 709/232 |
| 2002/0031142 | A1 * | 3/2002 | Metin et al. | 370/463 |
| 2002/0122547 | A1 | 9/2002 | Hinchey | |
| 2003/0009585 | A1 | 1/2003 | Antoine et al. | |
| 2005/0281265 | A1 * | 12/2005 | Sakamoto et al. | 370/390 |
| 2006/0129665 | A1 * | 6/2006 | Toebes et al. | 709/223 |
| 2008/0028445 | A1 * | 1/2008 | Dubuc et al. | 726/5 |
| 2008/0095120 | A1 * | 4/2008 | Hong et al. | 370/332 |

(Continued)

FOREIGN PATENT DOCUMENTS

| CN | 1937570 A | 3/2007 |
|---|---|---|
| CN | 101094129 A | 12/2007 |
| GB | 2459433 A | 10/2009 |
| WO | 2005114444 A1 | 12/2005 |

OTHER PUBLICATIONS

Hao, et al., "Enhancing Dynamic Cloud-based Services using Network Virtualization", retrieved at <<http://conferences.sigcomm.org/sigcomm/2009/workshops/visa/papers/p37.pdf>>, Aug. 17, 2009.

(Continued)

*Primary Examiner* — Patrice Winder
*Assistant Examiner* — Julian Chang
(74) *Attorney, Agent, or Firm* — Ben Tabor; Kate Drakos; Micky Minhas

(57) ABSTRACT

Architecture that facilitates communications between two network nodes of the different networks by providing a routing mechanism that uses alternative modalities driven entirely by policies that are authored and stored in a computing cloud and enforced on the client. This allows the selection of one network path over another path based on criteria such as, physical location of the hosts and service level agreements (SLAs) to be provided, for example. With respect for path selection, a packet can be routed through a datacenter closest to the hosts. With respect to SLAs, there may be different SLAs available to different clients. For clients with the highest bandwidth/uptime or other guarantees, a network path different from other types of clients can be selected. Additionally, connectivity can be allowed or disallowed based on other kinds of policy rules such as a virtual circle to which the hosts may belong.

19 Claims, 10 Drawing Sheets

(56) References Cited

U.S. PATENT DOCUMENTS

| | | | | |
|---|---|---|---|---|
| 2008/0162726 | A1* | 7/2008 | Hoover et al. | 709/245 |
| 2009/0228967 | A1 | 9/2009 | Gbadegesin et al. | |
| 2009/0276771 | A1* | 11/2009 | Nickolov et al. | 717/177 |
| 2010/0043050 | A1* | 2/2010 | Nadalin et al. | 726/1 |
| 2010/0125898 | A1* | 5/2010 | Dubuc et al. | 726/7 |
| 2010/0318645 | A1* | 12/2010 | Hoole et al. | 709/223 |
| 2011/0072101 | A1* | 3/2011 | Forssell et al. | 709/206 |
| 2011/0078292 | A1* | 3/2011 | Ananda et al. | 709/221 |

OTHER PUBLICATIONS

Valancius, et al., "Transit Portal: Bringing Connectivity to the Cloud", retrieved at <<http://conferences.sigcomm.org/sigcomm/2009/demos/sigcomm-pd-2009-final54.pdf>>, 2009.

"Sentrion Cloud Services: For Spam and Virus Filtering", retrieved at <<http://sendmail.com/pdfs/whitepapers/sentrion_cloud_services.pdf>>, Mar. 2009.

"Cloud Services and Cloud Infrastructure: The Critical Role of High-Performance Networks", retrieved at <<http://www.juniper.net/us/en/local/pdf/editorial/3200004-en.pdf>>, Jun. 2009.

"Nominum Broadens the Impact of Intelligent DNS with SKYE Cloud Services; New SKYE Business Unit Offers DNS and Advanced Applications for a Better Internet", retrieved at <<http://www.tmcnet.com/usubmit/2009/09/22/4383649.htm>>, Sep. 22, 2009.

"International Search Report", Mailed Date: Jun. 29, 2011, Application No. PCT/US2010/054568, Filed Date: Oct. 28, 2010, Pages 8.

Chinese Patent Application No. 201080050972.1, Amendment dated May 27, 2013, 13 pages (including English Translation), 11 pages.

Chinese Patent Application No. 201080050972.1, First Office Action dated Feb. 21, 2013, 11 pages (including English Translation), 11 pages.

English translation of Abstract of CN1937570, 1 page, 2007.
English translation of Abstract of CN101094129, 1 page, 2007.

Chinese Patent Application No. 201080050972.1, Office Action dated Aug. 1, 2013, 11 pages (including English Translation).

Chinese Patent Application No. 201080050972.1, English translation of Office Action dated Nov. 18, 2013, 6 pages (including English Translation).

* cited by examiner

SMART CLIENT ROUTING

BACKGROUND

Routing between two hosts (e.g., on the Internet) is typically handled based on the IP (Internet Protocol) addresses assigned to the hosts. Hence, the route chosen is determined using the IP addresses of the hosts involved. This technique may not be problem when the hosts are on the same network; however, this can be very problematic as requiring more administrative interaction when the hosts are on different networks. Moreover, since most hosts can connect to the Internet, the inability to conveniently interconnect hosts on the Internet is a technical and administrative challenge.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates communications between two network nodes of the different networks using alternative modalities driven entirely by policies that are authored and stored in the cloud and enforced on the client and/or outside the cloud, as desired. This allows the selection of one network path over another path based on criteria such as, physical location of the hosts and service level agreements (SLAs) to be provided, for example. This can be facilitated at least by a virtual layer employed over the physical layer in the network stack and supporting programs to provide smart client capability in routing selection between hosts.

With respect for path selection, a packet can be routed through a peer-to-peer connection or a relay connection. With respect to SLAs, there may be different SLAs available to different clients. For clients with the highest bandwidth/uptime or other guarantees, a network path different from one for other types of clients can be selected. Additionally, connectivity can be allowed or disallowed based on other kinds of policy rules such as a virtual circle to which the hosts may belong.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
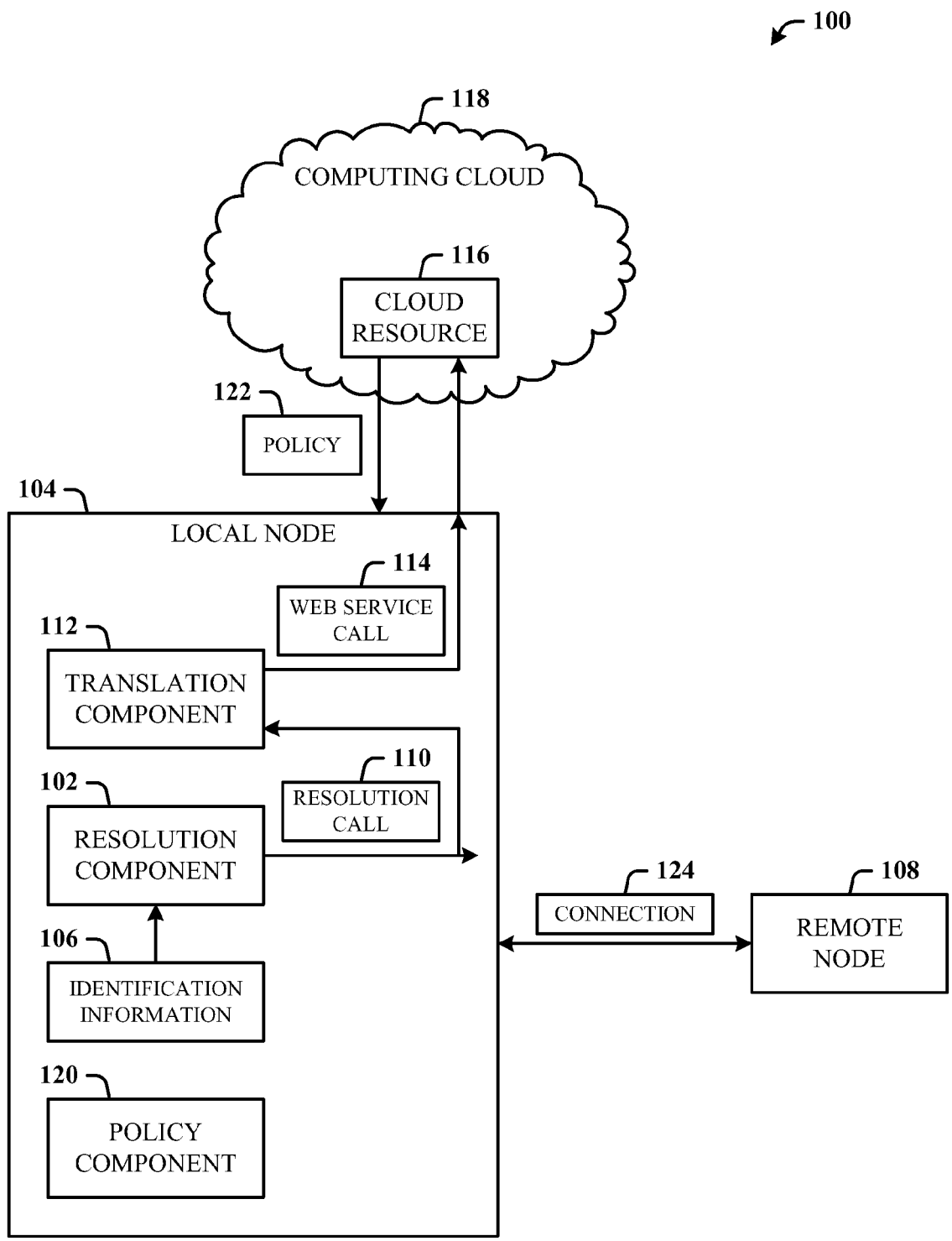
FIG. 1 illustrates computer-implemented connectivity system in accordance with the disclosed architecture.

The disclosed architecture is smart network switching based on policies. Network switching is employed in conjunction with cloud computing to enable on-premise connectivity with cloud-based resources. Note, however, this is just one scenario for smart routing, in that smart routing is applicable generally to any two or more endpoints irrespective of whether the endpoints are in the cloud or a corpnet. The architecture provides a combination of policy authoring of connectivity rules, name service resolution hooks, as well as dynamic routing on the client, that allow the selection of the most appropriate path through which two host machines can connect to each other. This allows flexibility in terms of guaranteeing the lowest operations cost for a vendor, providing the highest service level agreement (SLA) for the customer, or a combination of both.

Policies (e.g., cloud-based) can be utilized to determine various connectivity rules that are applied to determine the order in which the routing will be performed. For instance, a policy manifest can indicate that for a client connecting to another client: the two clients shall exist in the same circle and that the connections will first attempt tunneling (e.g., Teredo-based) in peer-to-peer (P2P) connectivity, if available, before attempting a cloud-mediated connectivity method such as SSTP (secure socket tunneling protocol).

Policies can be defined at various levels. For example, policies can be defined to, determine a connection between two specific hosts, and in the context of circles and links determine a connection between two different hosts within the same circle, linked circles, or even to define connectivity between any two machines without the machines being part of the same circle and not linked in any way. (Circles can be described as associations of users or organizations over networks and the links are the relationships between the users or organizations.) These policies can be determined a priori, such as statically, or generated based on a set of rules the inputs of which include, and are not limited to, geolocation, SLA, desired costs, circle membership, etc.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates computer-implemented connectivity system 100 in accordance with the disclosed architecture. The system 100 includes a resolution component 102 of a local node 104 that attempts resolution of identification information 106 of a remote node 108 to which connectivity is intended, using a resolution call 110. A translation component 112 of the local node 104 intercepts the resolution call 110 and translates the resolution call 110 into a web service call 114 to a resource 116 of a computing cloud 118. A policy component 120 of the local node 104 receives a policy 122 from the computing cloud 118 and establishes a connection 124 between the local node 104 and the remote node 108 based on the policy 122.

The policy 122 received from the computing cloud 118 can be selected based on the identification information 106, which is a name of the remote node 108 and the resolution call 110 which is a name resolution call. The policy 122 also facilitates creation of the connection 124 by selection of one network path over another network path. Still further, the policy 122 facilitates creation of the connection 124 based on at least one of physical location of the local node 104 or physical location of the remote node 108 relative to a datacenter. Additionally, the policy 122 facilitates creation of the connection 124 based on a service level agreement. The policy 122 also facilitates creation of the connection 124 based on a virtual circle to which at least one of the local node 104 or the remote node 108 is associated. The policy component 120 configures the connection 124 to the remote node 108 through a relay server.

In other words, a host (e.g., local node 104) attempting to connect to another host (e.g., remote node 108, which can be client or server) first attempts to resolve the name of the other node (e.g., remote node 108). The name resolution call (e.g., resolution call 110) is interpreted on the client (local node 104) and translated into a cloud-based web service call (web service call 114) to an implementation of name resolution in the cloud 118. Note, however, this is just one example of an interception technique, since interception can be performed using various implementations such as local-based and/or cloud-based. The implementation uses policies (e.g., policy 122) to determine the network costs for the various networks and then sends this to the aforementioned host.

The host (local node 104) uses the information obtained from the cloud-based service to inform the name resolver of the local node 104 the address to be used for the connection 124, configure the appropriate connectivity to a relay server (e.g., SSTP, etc.), and sets a routing table on a virtual adapter of the local node 104 to enable use of the desired connection. However, it is to be understood that in a broader context, the instant architecture enables connectivity between any two network endpoints irrespective of endpoint location. Thus, although described in the context of on-premise and/or cloud-based implementations, the architecture can be applied more generally. One or more of these steps can be performed at client initialization time (e.g., when the machine boots up or the correct user logs on to the machine), while other steps can be performed at actual connection set up time.

Figure 2:
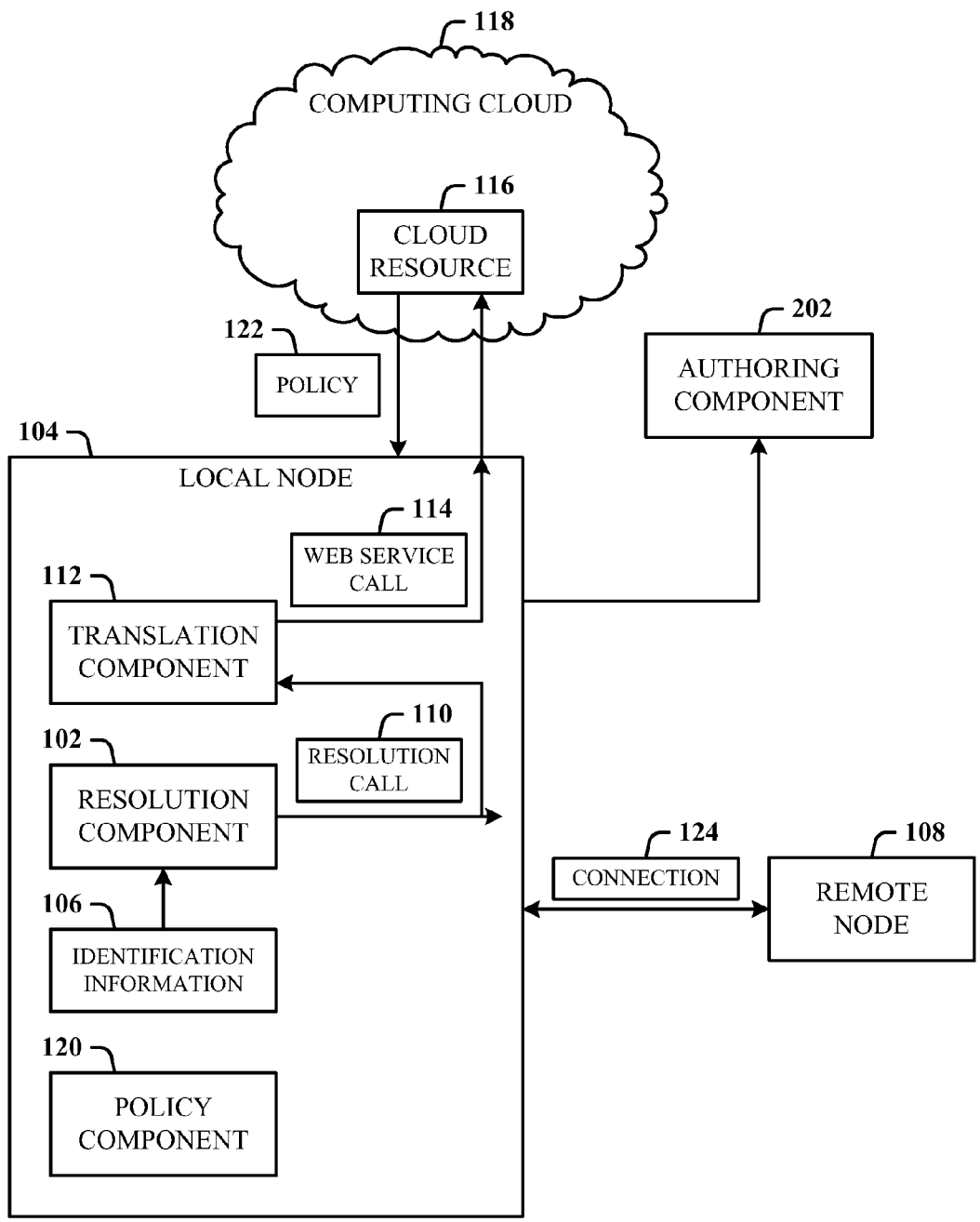
FIG. 2 illustrates an alternative embodiment of a connectivity system that includes an authoring component.

FIG. 2 illustrates an alternative embodiment of a connectivity system 200 that includes an authoring component 202. The authoring component 202 for authoring the policy that includes connectivity rules for establishing communications between the local and remote nodes, and storing the policy in the cloud.

As depicted, the system 200 also includes the entities and components described in FIG. 1. The system 200 includes the resolution component 102 of the local node 104 that attempts resolution of identification information 106 of a remote node 108 to which connectivity is intended, using the resolution call 110, which is a name resolution call. The translation component 112 of the local node 104 intercepts the resolution call 110 (e.g., name resolution call) and translates the resolution call 110 into the web service call 114 (e.g., cloud-based) to the resource 116 (one of many possible cloud resources) of the computing cloud 118. The policy component 120 of the local node 104 receives the policy 122 from the computing cloud 118 and establishes the connection 124 between the local node 104 and the remote node 108 based on the policy 122.

It is to be appreciated that the remote node 108 can include the same components as the local node 104 when attempting connectivity to the local node 104 and/or another node.

Figure 3:
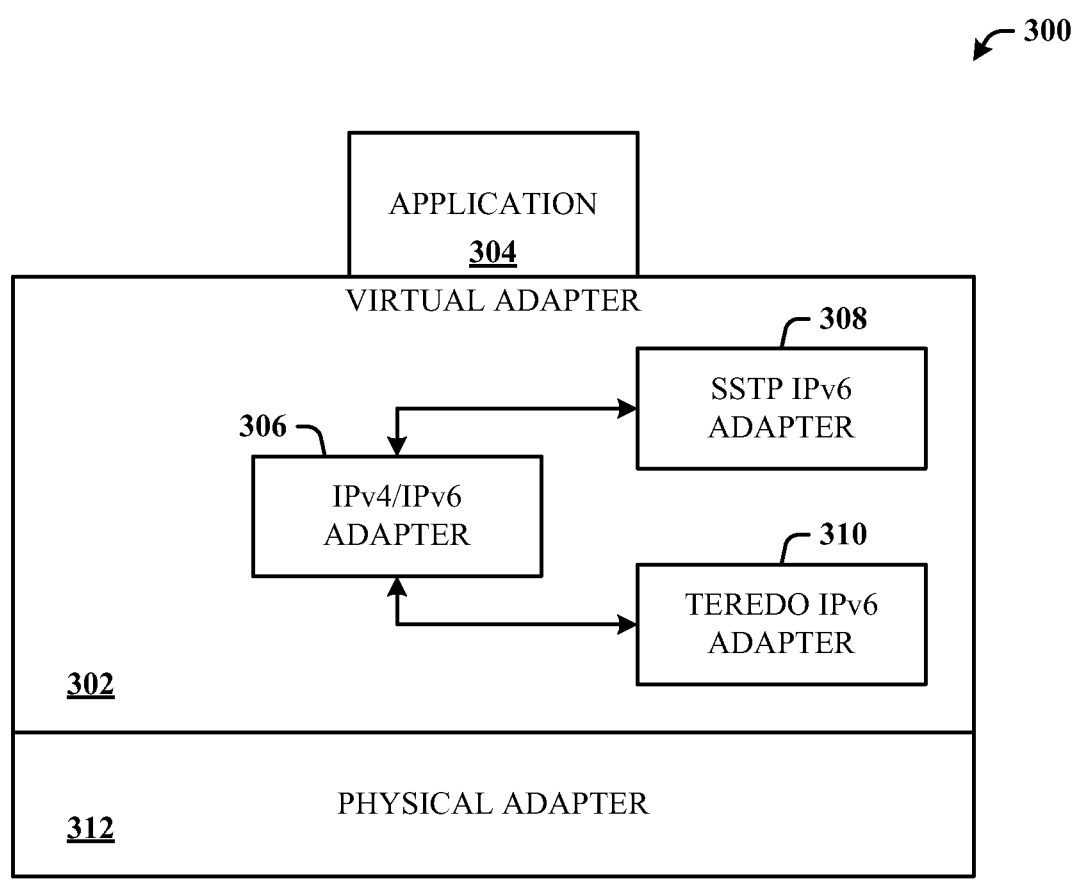
FIG. 3 illustrates a local node system that utilizes a virtual adapter to facilitate path selection as defined according to the policy received from the computing cloud.

FIG. 3 illustrates a local node system 300 that utilizes a virtual adapter 302 to facilitate path selection as defined according to the policy received from the computing cloud. In this specific example, consider that the cloud is designed to be an IPv6-only infrastructure, although the applicability of the disclosed architecture is not so limited. Further consider that a well-written application 304 will process all the returned addresses from the cloud until the application 304 succeeds in connecting to the remote node. Based on a policy received from the cloud, the application 304 will pick the IPv6 destination address (of the remote node), and IPv6 source address (of the local node) exposed by a virtual adapter 302 of the local node.

The virtual adapter 302 is created, as further illustrated, to include IPv4 and IPv6 addresses associated with an IPv4/IPv6 adapter 306 that interfaces to an SSTP IPv6 adapter 308 and a Teredo IPv6 adapter 310. Based on which transport (Teredo vs. SSTP) is available the virtual adapter 302 encapsulate the IPv4/IPv6 packet in an appropriate IPv6 packet and inject the packet back into the client stack to be handled by SSTP or Teredo. As illustrated, the virtual adapter 302 can be designed to overlay the physical layer 312.

With respect to assignment to interfaces the local node can talk to the cloud service to reserve an IPv4 address. This IP address is assigned to the virtual adapter. Additionally, a prefixed IPv6 address will be generated from this IPv4 address and assigned to the same interface. When a Teredo local node talks to a Teredo server, the Teredo IPv6 address is assigned to the local node.

Similarly, when an SSTP local node attempts to setup an SSTP tunnel, an SSTP server can hand out an IPv6 address by combining the reserved IPv4 address and site ID. The local node uploads all these IP addresses belonging to the cloud service. Thus, there can be four addresses associated per node: the virtual adapter IPv4 address, virtual adapter IPv6 address, Teredo IPv6 address, and SSTP IPv6 address. Of these four addresses, the virtual adapter addresses are exposed to the applications (e.g., application 304). Domain name service (DNS) name query from the node resolve these two addresses.

Sets of related addresses can be maintained as a tuples, for example, <virtual adapter IPv4 address, Teredo IPv6 address, relay IPv6 address>. Then, given a destination IPv4 address, routing can be performed accordingly. Another variant is if the source and/or destination have global IPv4/IPv6 connectivity, the system is bypassed. If the global IPv6 address is added to this tuple, then the global IPv6 addresses can be leveraged as well.

Inside the virtual adapter 302, the four addresses associated with the destination can be cached. Connectivity processing can be according to a predetermined order. For example, connectivity to the destination can be attempted in the following order: first, the Teredo IPv6 address, followed by the SSTP IPv6 address, the adapter IPv4 address and then encapsulation in the adapter SSTP IPv6. A Teredo connection is attempted on a peer IPv6 Teredo address. If this connection succeeds, then the virtual adapter 302 encapsulates the IPv6 traffic inside the Teredo IPv6 address, and sends the encapsulated IPv6 traffic out on the Teredo interface (Teredo adapter 310).

If the above fails, the virtual adapter 302 attempts to reach the destination (remote node) using SSTP IPv6 address. The reachability can be verified by a ping mechanism. If this connection succeeds, the virtual adapter 302 encapsulates the traffic in SSTP IPv6 packets and sends the encapsulated traffic out on the SSTP interface (SSTP adapter 308).

If the above connection through IPv6 fails, the application 304 can pick the remote node IPv4 address and attempt to connect. This connection has a high probability in succeeding, as most, if not all, applications will be listening on IPv4. In response to this success, the virtual adapter 302 encapsulates the traffic in SSTP IPv6 and sends the encapsulated traffic over the SSTP interface (SSTP adapter 308).

With respect to IPv4 over IPv6 encapsulation by the virtual adapter 302, the virtual adapter 302 can be implemented as an NDIS (network drive interface specification) miniport driver. The virtual adapter 302 can be configured to be selected for IPv4 communications. This way, the virtual adapter 302 can intercept all IPv4 traffic.

Which IPv6 address (e.g., SSTP versus Teredo) is used for encapsulation can be determined as follows. If the Teredo interface is connected, an attempt is made to ping the Teredo IP of the peer. The teredo IPv6 address of peer can be determined by combining the destination IPv4 address, Teredo prefix, and site ID. If the ping succeeds on Teredo IPv6 address, the Teredo IPv6 addresses can be used for encapsulation. If the above fails, then retry on SSTP IPv6 address of the peer. If successful, use the SSTP IPv6 addresses for encapsulation.

After the IPv4-over-IPv6 encapsulation, the virtual adapter 302 inserts the packet back into the TCP/IP stack so that the packet can be correctly picked up by SSTP or Teredo. To make this happen, extra information (set a flag) can be added in the IPv6 header during encapsulation at the virtual adapter 302. When the receiver receives the IPv6 packet the receiver looks at the flag and decides if the IPv6 packet needs to be decapsulated by the virtual adapter 302 or to simply bypass the virtual adapter 302. One option is to set the next header field in the outer IPv6 header to four, thereby indicating that the IPv4 packet is encapsulated inside this IPv6 packet. Other options can also be applied.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
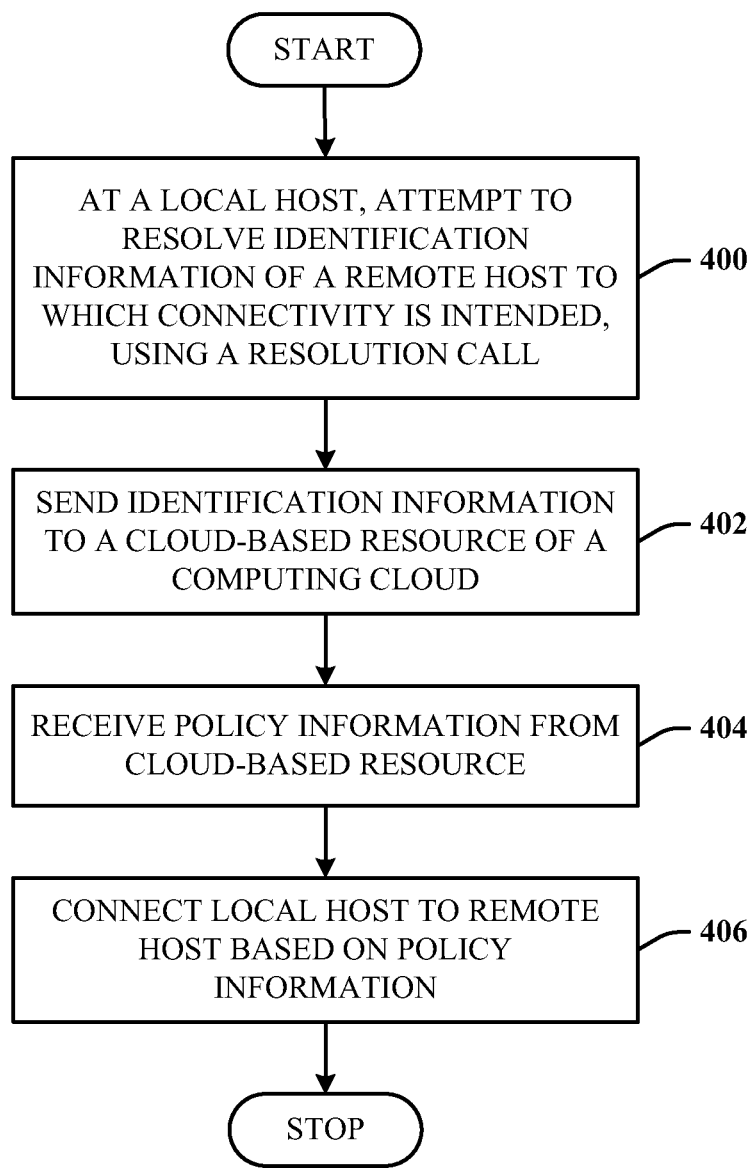
FIG. 4 illustrates a computer-implemented host connectivity method in accordance with the disclosed architecture.

FIG. 4 illustrates a computer-implemented host connectivity method in accordance with the disclosed architecture. At 400, at a local host, an attempt is made to resolve identification information of a remote host to which connectivity is intended, using a resolution call. At 402, the identification information is sent to a cloud-based resource of a computing cloud. At 404, policy information is received from the cloud-based resource. At 406, the local host is connected to the remote host based on the policy information.

Figure 5:
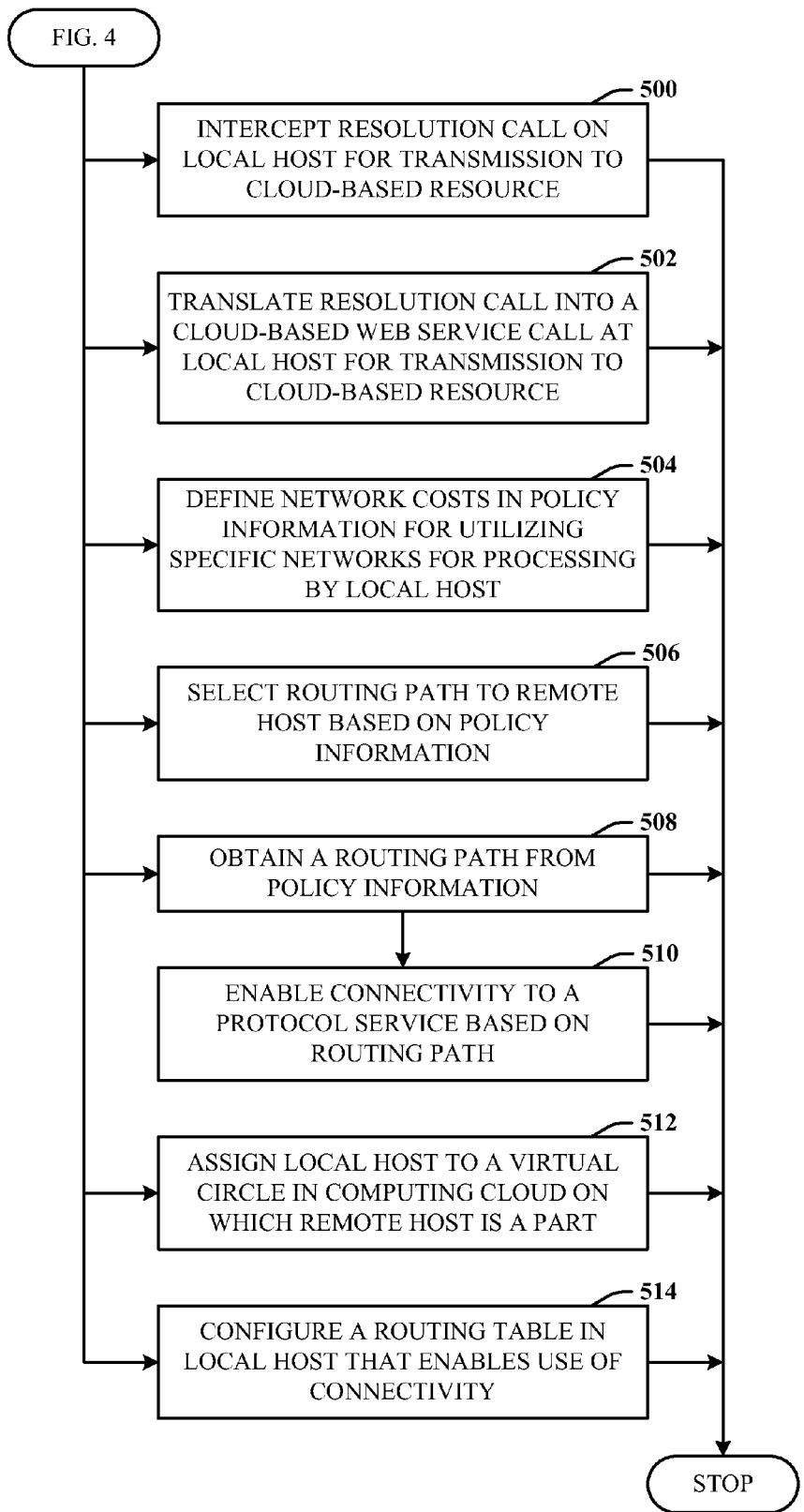
FIG. 5 illustrates additional aspects of the method of FIG. 4.

FIG. 5 illustrates additional aspects of the method of FIG. 4. At 500, the resolution call is intercepted on the local host for transmission to the cloud-based resource. At 502, the resolution call is translated into a cloud-based web service call at the local host for transmission to the cloud-based resource. At 504, network costs are defined in the policy information for utilizing specific networks for processing by the local host. At 506, a routing path to the remote host is selected based on the policy information. At 508, a routing path is obtained from the policy information. At 510, connectivity to a protocol service is enabled based on the routing path. At 512, the local host is assigned to a virtual circle in the computing cloud on which the remote host is a part. At 514, a routing table in the local host is configured that enables use of the connectivity.

Figure 6:
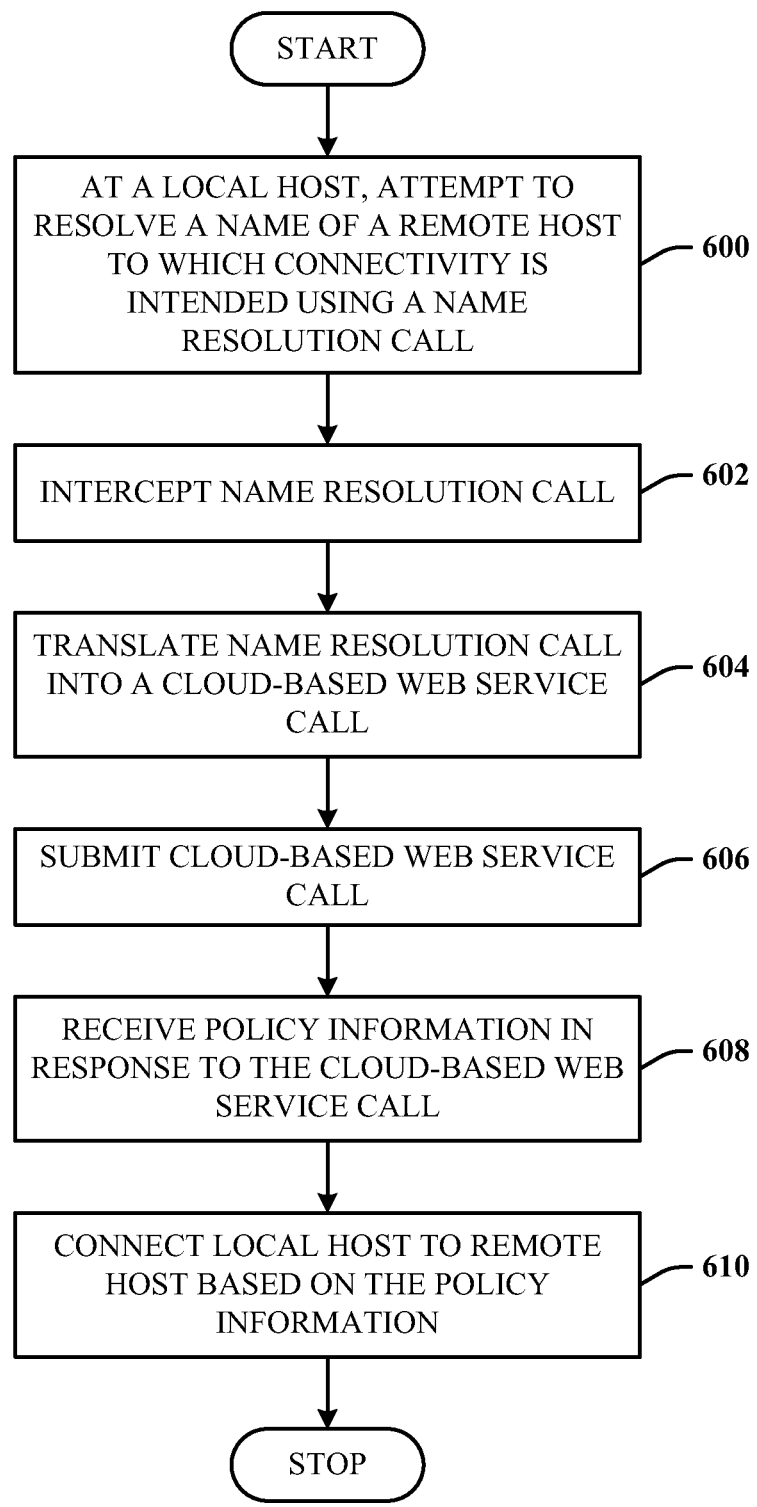
FIG. 6 illustrates an alternative host connectivity method.

FIG. 6 illustrates an alternative host connectivity method. At 600, at a local host, resolve of a name of a remote host to which connectivity is intended is attempted using a name resolution call. At 602, the name resolution call is intercepted. At 604, the name resolution call is translated into a cloud-based web service call. At 606, the cloud-based web service call is submitted. The submission can be to a computing cloud. At 608, policy information is received in response to the cloud-based web service call. At 610, the local host is connected to the remote host based on the policy information.

Figure 7:
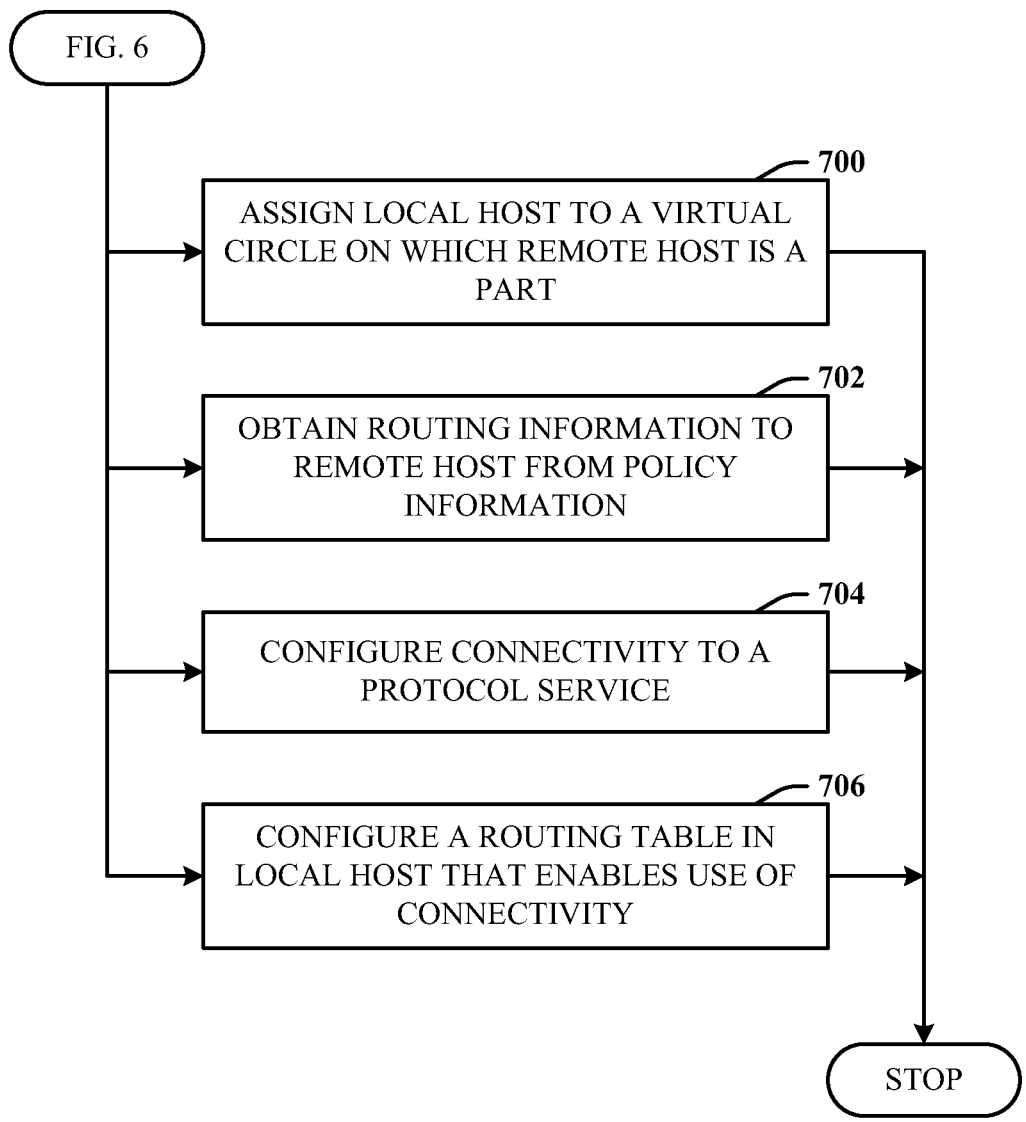
FIG. 7 illustrates additional aspects of the method of FIG. 6.

FIG. 7 illustrates additional aspects of the method of FIG. 6. At 700, the local host is assigned to a virtual circle on which the remote host is a part. At 702, routing information to the remote host is obtained from the policy information. At 704, the connectivity is configured to a protocol service. At 706, a routing table in the local host is configured that enables use of the connectivity.

Figure 8:
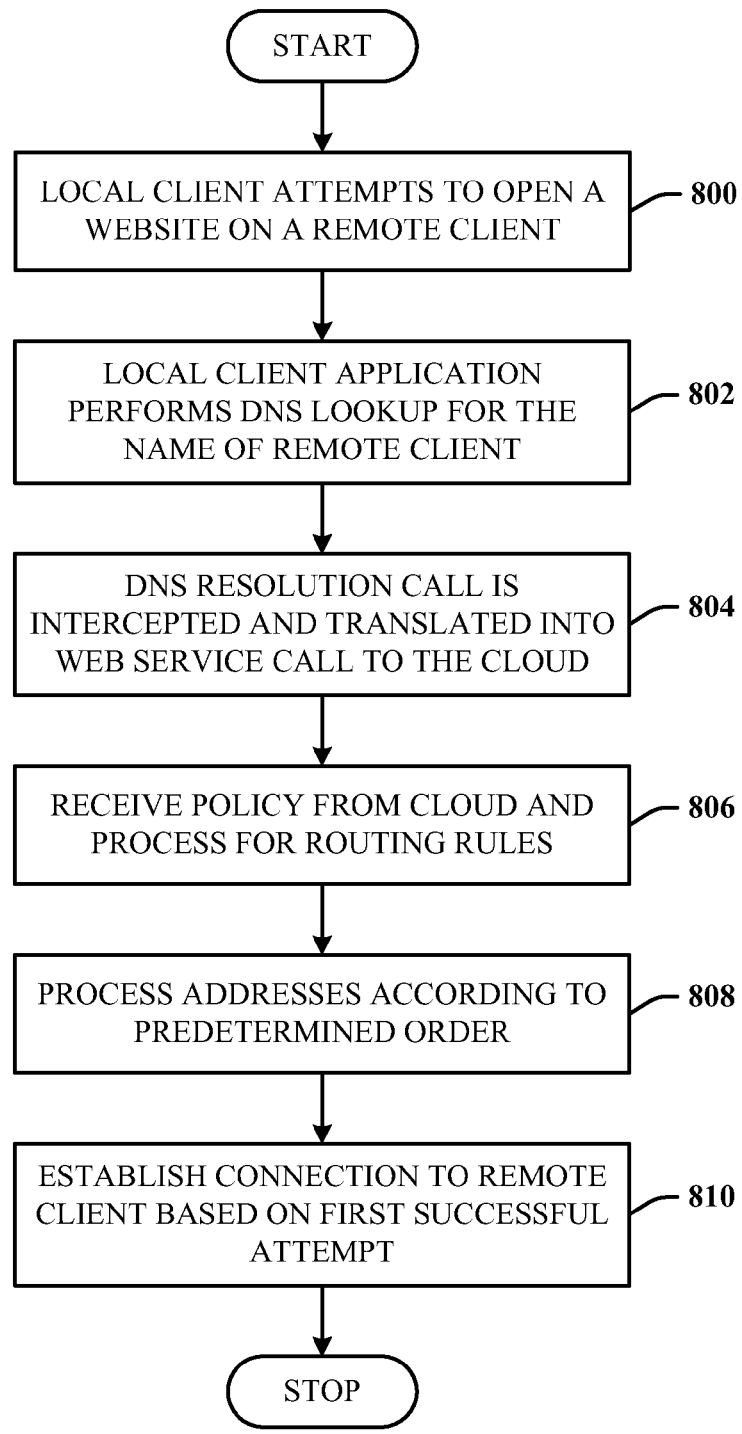
FIG. 8 illustrates yet another an alternative host connectivity method.

FIG. 8 illustrates yet another an alternative host connectivity method. At 800, a local client attempts to open a website on a remote client. At 802, a local client application performs a domain name service (DNS) lookup for the name of the remote client. The local client application receives two addresses: an IPv4 address for the remote client and an IPv6 address for the remote client. A well-written application will process all the returned addresses until it succeeds. At 804, the DNS resolution call is intercepted and translated into web service call to the cloud.

At 806, a policy received from the cloud is processed to obtain the associated routing rule(s). For example, based on the policy, the application will pick the IPv6 remote (destination) address and IPv6 local (source) address exposed by a virtual adapter of the local client. At 808, the addresses are processed according to a predetermined order. For example, the rules can indicate to process IPv6 address before IPv4 addresses and then according to one protocol (e.g., Teredo) over another protocol (e.g., SSTP). At 810, the connection to the destination is established based on the first successful attempt.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
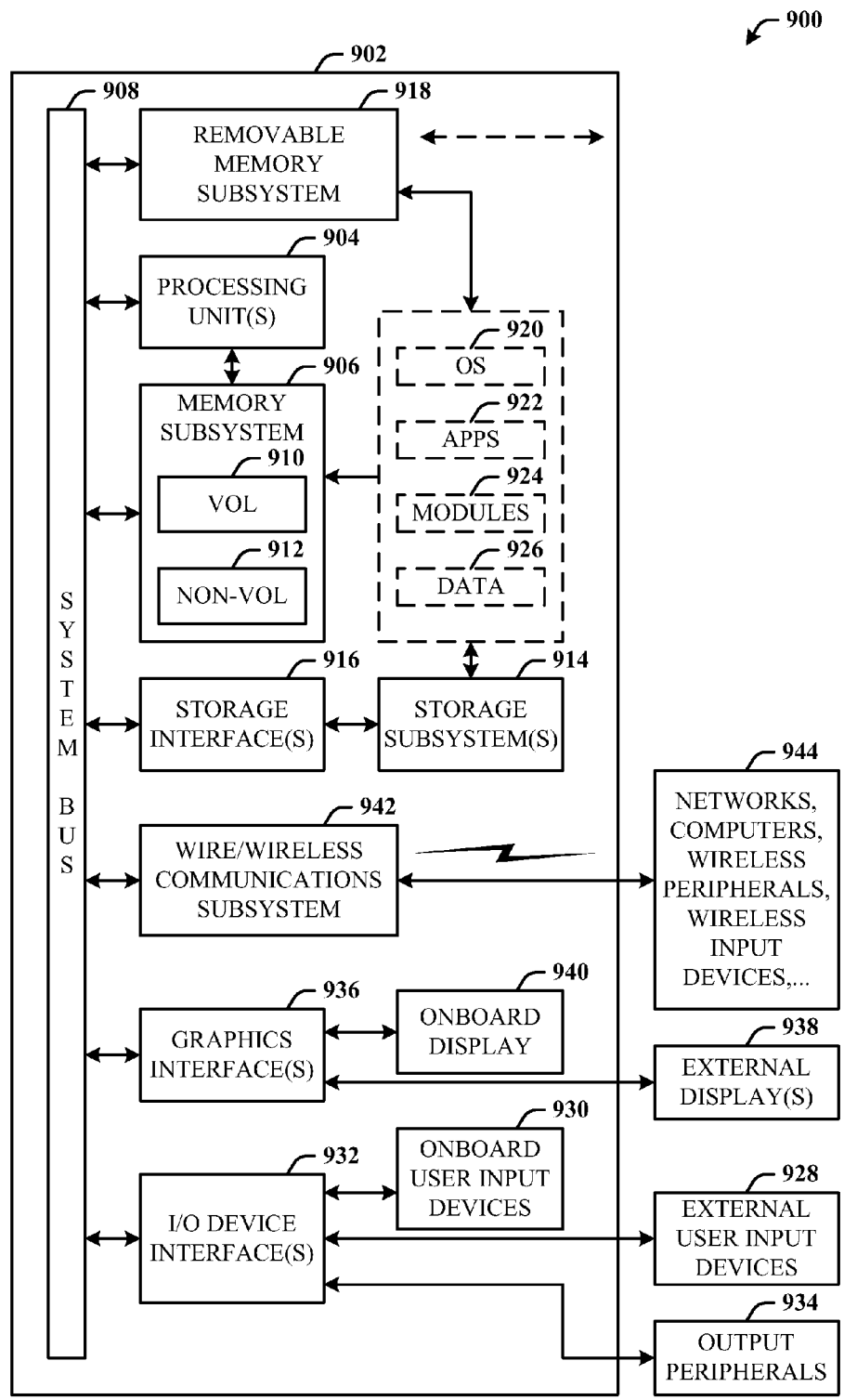
FIG. 9 illustrates a block diagram of a computing system operable to execute cloud-based connectivity in accordance with the disclosed architecture.

Referring now to FIG. 9, there is illustrated a block diagram of a computing system 900 operable to execute cloud-based connectivity in accordance with the disclosed architecture. In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a computer-readable storage such as a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include computer-readable storage such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the memory subsystem 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The one or more application programs 922, other program modules 924, and program data 926 can include the local node 104, policy 122 and entities/components of the local node 104 of FIG. 1, the virtual adapter layer 302 of FIG. 3, and the methods represented by the flow charts of FIGS. 4-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Computer readable media can be any available media that can be accessed by the computer 902 and includes volatile and non-volatile internal and/or external media that is removable or non-removable. For the computer 902, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 10:
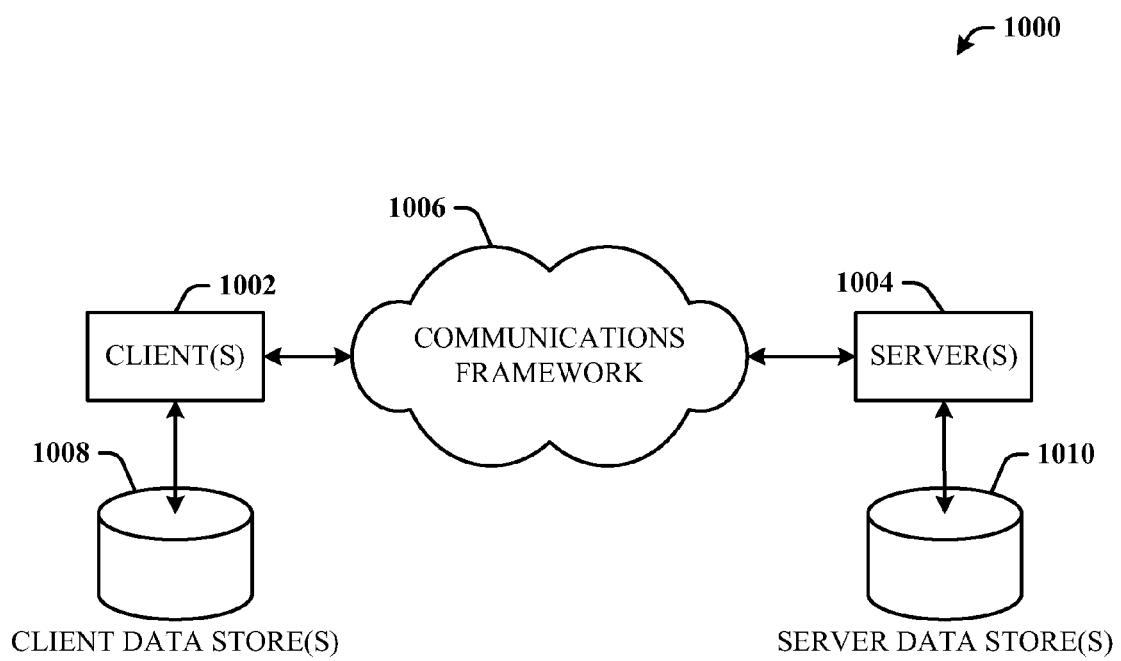
FIG. 10 illustrates a schematic block diagram of a computing environment in which cloud-based connectivity is deployed.

Referring now to FIG. 10, there is illustrated a schematic block diagram of a computing environment 1000 in which cloud-based connectivity is deployed. The environment 1000 includes one or more client(s) 1002. The client(s) 1002 can be hardware and/or software (e.g., threads, processes, computing devices). The client(s) 1002 can house cookie(s) and/or associated contextual information, for example.

The environment 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communication network such as the Internet) that can be employed to facilitate communications between the client(s) 1002 and the server(s) 1004.

Communications can be facilitated via a wire (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented connectivity system, comprising:
    a local node comprising a processing unit coupled to a memory, the local node further comprising:
        a resolution component of the local node that attempts resolution of identification information of a remote node to which connectivity is intended, using a resolution call;
        a translation component of the local node that intercepts the resolution call and translates the resolution call into a web service call to a resource; and
        a policy component of the local node that receives a policy and establishes a connection between the local node and the remote node based on the policy by, based on the received policy, informing a name resolver of the local node of an address to be used for the connection and setting a routing table on a virtual adapter of the local node to enable use of a desired connection, wherein based on the received policy a destination address of the remote node and a source address of the local node are exposed by the virtual adapter.

2. The system of claim 1, wherein the policy received is selected based on the identification information which is a name of the remote node and the resolution call which is a name resolution call.

3. The system of claim 1, wherein the policy facilitates creation of the connection by selection of one network path over another network path.

4. The system of claim 1, wherein the policy facilitates creation of the connection based on at least one of physical location of the local node or physical location of the remote node relative to a datacenter.

5. The system of claim 1, wherein the policy facilitates creation of the connection based on a service level agreement.

6. The system of claim 1, wherein the policy facilitates creation of the connection based on a virtual circle to which at least one of the local node or the remote node is associated.

7. The system of claim 1, wherein the policy component configures the connectivity to the remote node through a relay server.

8. The system of claim 1, further comprising an authoring component for authoring the policy that includes connectivity rules for establishing communications between the local and remote nodes, and storing the policy.

9. A computer-implemented connectivity system, comprising:
    a local node comprising a processing unit coupled to a memory, the local node further comprising:
        a resolution component of a the local node that attempts name resolution of a remote node to which connectivity is intended, using a name resolution call;
        a translation component of the local node that intercepts the name resolution call and translates the name resolution call into a cloud-based web service call to a resource of a computing cloud; and a policy component of the local node that receives a policy from the computing cloud and establishes a connection between the local node and the remote node based on the policy by, based on the received policy, informing a name resolver of the local node of an address to be used for the connection and setting a routing table on a virtual adapter of the local node to enable use of a desired connection, wherein based on the received policy a destination address of the remote node and a source address of the local node are exposed by the virtual adapter.

10. The system of claim 9, wherein the policy is processed to establish the connection by selection of one network path over another network path as defined by one or more policy rules.

11. The system of claim 9, wherein the policy is processed to establish creation of the connection based on at least one of physical location of the local node or physical location of the remote node relative to a datacenter, based on a service level agreement, based on association of at least one of the local node or the remote node to a virtual circle.

12. The system of claim 9, further comprising an authoring component for authoring the policy that includes connectivity rules for establishing communications between the local and remote nodes, and storing the policy in the cloud.

13. A computer-implemented host connectivity method, comprising:
   at a local host, attempting to resolve identification information of a remote host to which connectivity is intended, using a resolution call;
   sending the identification information to a cloud-based resource of a computing cloud;
   receiving policy information from the cloud-based resource; and
   connecting the local host to the remote host based on the policy information by, based on the received policy, informing a name resolver of the local node of an address to be used for the connection and setting a routing table on a virtual adapter of the local node to enable use of a desired connection, wherein based on the received policy a destination address of the remote node and a source address of the local node are exposed by the virtual adapter.

14. The method of claim 13, further comprising intercepting the resolution call on the local host for transmission to the cloud-based resource.

15. The method of claim 13, further comprising translating the resolution call into a cloud-based web service call at the local host for transmission to the cloud based resource.

16. The method of claim 13, further comprising defining network costs for utilizing specific networks in the policy information for processing by the local host.

17. The method of claim 16, further comprising selecting a routing path to the remote host based on the policy information.

18. The method of claim 13, further comprising:
   obtaining a routing path from the policy information; and
   enabling connectivity to a protocol service based on the routing path.

19. The method of claim 13, further comprising assigning the local host to a virtual circle in the computing cloud on which the remote host is a part.

* * * * *